(12) United States Patent
Nagaya et al.

(10) Patent No.: US 7,029,391 B2
(45) Date of Patent: Apr. 18, 2006

(54) BLOWER UNIT AND AIR CONDITIONING UNIT INCLUDING THE SAME AND METHOD OF CONTROLLING THE SAME

(75) Inventors: Masakazu Nagaya, Nagoya (JP); Koji Ito, Nagoya (JP); Takahiro Tokunaga, Kosai (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/941,778

(22) Filed: Sep. 15, 2004

(65) Prior Publication Data
US 2005/0070220 A1    Mar. 31, 2005

(30) Foreign Application Priority Data
Sep. 29, 2003   (JP) .............................. 2003-336943

(51) Int. Cl.
*B60H 1/26* (2006.01)

(52) U.S. Cl. ..................... 454/156; 165/42; 165/203; 415/127; 415/138

(58) Field of Classification Search ................ 454/156, 454/159–161; 165/42, 43, 203; 415/127, 415/128
See application file for complete search history.

(56) References Cited

U.S. PATENT DOCUMENTS

| | | | | |
|---|---|---|---|---|
| 3,147,909 A | * | 9/1964 | Novitsky | ..................... 415/127 |
| 4,476,773 A | * | 10/1984 | Fehr | ........................... 454/121 |
| 6,247,530 B1 | | 6/2001 | Mochizuki et al. | |
| 2005/0016723 A1 | * | 1/2005 | Araki | ........................ 165/202 |

FOREIGN PATENT DOCUMENTS

| | | |
|---|---|---|
| JP | 50-63806 | 5/1975 |
| JP | 56-14896 | 2/1981 |
| JP | 59-77918 | 5/1984 |
| JP | 2000-161298 | 6/2000 |

* cited by examiner

Primary Examiner—Harold Joyce
(74) Attorney, Agent, or Firm—Harness, Dickey & Pierce, PLC

(57) ABSTRACT

A blower unit of an air conditioning unit including a scroll casing including a first engaging portion, a fan casing including a first engaging portion, and a controller for controlling an electric motor to move at least one of the scroll casing and the fan casing such that the movement of at least one of the scroll casing and the fan casing stops when the first engaging portion of the scroll casing abuts the first engaging portion of the fan casing. The precision of the position of the scroll casing with respect to the fan casing, the precision of the temperature of air discharged into the compartment, and/or the volume of the blower unit may be improved.

29 Claims, 7 Drawing Sheets

BLOWER UNIT AND AIR CONDITIONING UNIT INCLUDING THE SAME AND METHOD OF CONTROLLING THE SAME

PRIORITY STATEMENT

This U.S. nonprovisional application claims priority on Japanese Patent Application No. 2003-336943 filed on Sep. 29, 2003, the entire disclosure of which is incorporated herein by reference.

FIELD OF THE INVENTION

The present invention relates to a blower unit, an air conditioning unit including a blower unit, and a method of controlling the same.

BACKGROUND OF THE INVENTION

In conventional blower units, a fan generating air flow may be accommodated in a scroll casing and two ducts may be provided around the scroll casing. The scroll casing may rotate around an axis thereof and stop at two positions. In one position, a discharge port of the scroll casing may be connected to an inlet of one duct. In the other position, a discharge port of the scroll casing may be connected to an inlet of the other duct. In conventional blower units, it may not be clear how to stop the scroll casing. Further, it may be difficult to stop the scroll casing at a desired position.

SUMMARY OF THE INVENTION

Example embodiments of the present invention provide a new blower unit different from conventional blower units.

Example embodiments of the present invention provide a new air conditioning unit with the new blower unit.

Example embodiments of the present invention may improve the precision of the position of a scroll casing with respect to a fan casing of the new blower unit.

Example embodiments of the present invention may improve the precision of the temperature of air discharged into a compartment from the new blower unit.

Example embodiments of the present invention may reduce the volume of the new blower unit.

In an example embodiment, the present invention is directed to a blower unit including a scroll casing accommodating a fan therein, the scroll casing including a first engaging portion, a fan casing accommodating the scroll casing therein, the fan casing including a first engaging portion, and a controller for controlling an electric motor to move at least one of the scroll casing and the fan casing such that the movement of at least one of the scroll casing and the fan casing stops when the first engaging portion of the scroll casing abuts the first engaging portion of the fan casing.

In an example embodiment, the present invention is directed to an air conditioning unit including a blower unit generating air flow, an air conditioning case disposed on a downstream side of the air flow, a first air path accommodated in said air conditioning case, and a second air path accommodated in said air conditioning case, said air conditioning case including an air opening, through which air from said first air path and air from said second air path may pass therethrough, wherein the blower unit further includes a scroll casing accommodating a fan therein, the scroll casing including a first engaging portion, a fan casing accommodating the scroll casing therein, the fan casing including a first engaging portion, and a controller for controlling an electric motor to move at least one of the scroll casing and the fan casing such that the movement of at least one the scroll casing and the fan casing stops when the first engaging portion of the scroll casing abuts the first engaging portion of the fan casing.

In an example embodiment, the present invention is directed to a method of controlling relative movement of a scroll casing and a fan casing of a blower unit, including providing a scroll casing for accommodating a fan therein, the scroll casing including a first engaging portion, providing a fan casing for accommodating the scroll casing therein, the fan casing including first engaging portion, and controlling an electric motor to move at least one of the scroll casing and the fan casing such that the movement of at least one of the scroll casing and the fan casing stops when the first engaging portion of the scroll casing abuts the first engaging portion of the fan casing.

BRIEF DESCRIPTION OF THE DRAWINGS

The present invention will be more readily apparent from the following detailed description of example embodiments when taken together with the accompanying drawings, in which.

DETAILED DESCRIPTION OF EXAMPLE EMBODIMENTS

Example embodiments of the present invention will be described hereinafter with reference to the accompanying drawings.

Figure 1A:
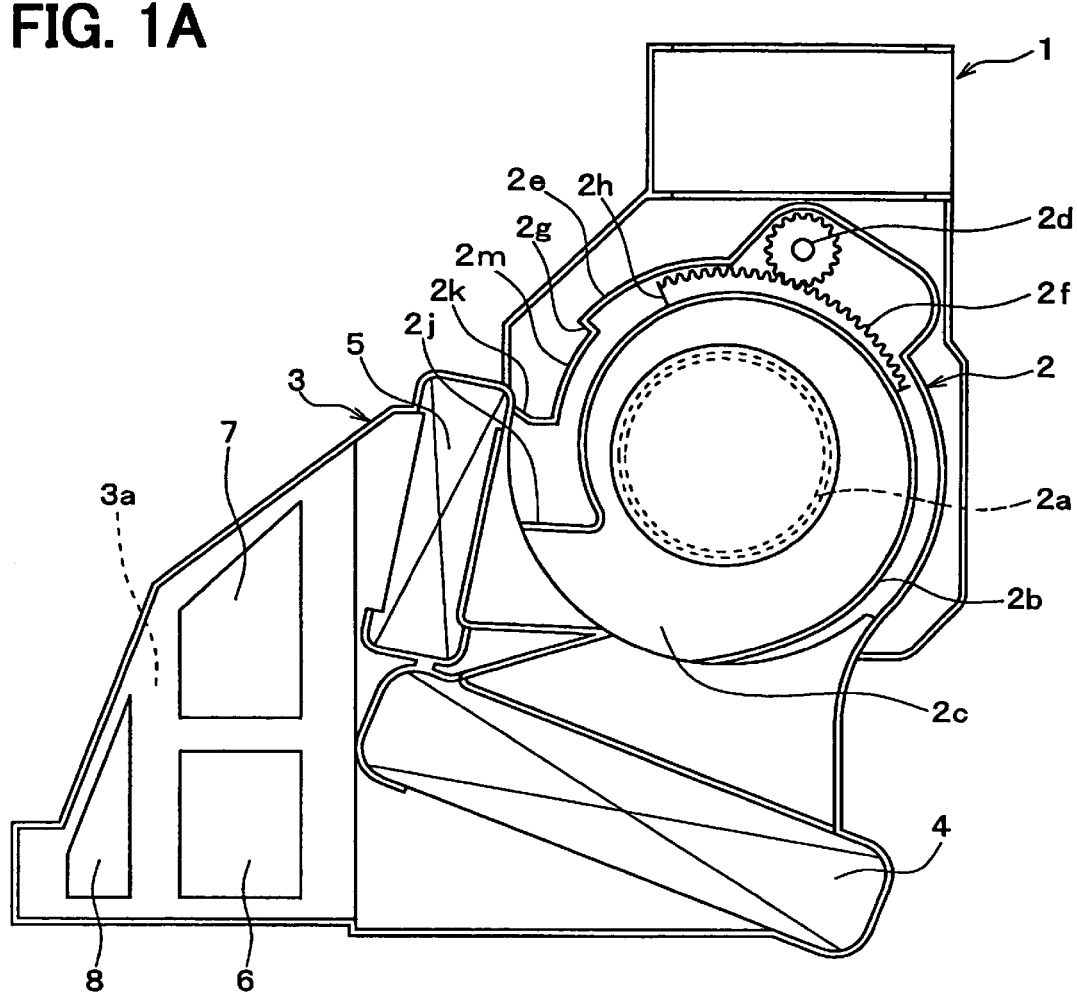
FIG. 1A illustrates an air conditioning unit in an air-mixing mode according to an example embodiment of the present invention.

FIG. 1A illustrates an air conditioning unit according to an example embodiment of the present invention. A blower unit 2, which may be part of the air conditioning unit 1, may generate air flow to a vehicle compartment. The blower unit 2 may suck internal air from a rear tray disposed in the vicinity of a rear window glass and supply the internal air to an evaporator 4 and a heater 5.

The blower unit 2 may include a fan 2a, for example a centrifugal fan, for example, rotated by an electric motor 9 (shown in FIG. 1B), a scroll casing 2b accommodating the fan 2a, a discharge port 2c, a drive gear 2d rotating the scroll casing 2b, and/or a fan casing 2e accommodating the scroll casing 2b.

In an example embodiment, the fan 2a may be a centrifugal fan, for example, Japanese Industrial Standard (JIS) B 0132, No. 1004, etc., which may suck air from an axial direction thereof and may discharge air in a radial direction thereof, and the scroll casing 2b may form a scroll-shaped air passage for gathering the air discharged from the centrifugal fan 2a.

According to an example embodiment, the blower unit 2 may be disposed such that a rotating axis of the centrifugal fan 2a is parallel or substantially parallel to a vehicle width direction.

Further, the scroll casing 2b may rotate around an axis thereof. The axis of the scroll casing 2b and that of the centrifugal fan 2a may be coaxial.

Figure 1B:
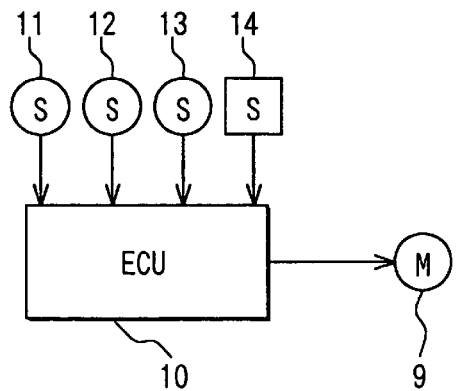
FIG. 1B illustrates an electronic control unit (ECU) and an electric motor according to an example embodiment of the present invention.

When the drive gear 2d is rotationally driven by the electric motor 9, such as a servo motor, shown in FIG. 1B, the scroll casing 2b may rotate around the axis of the fan 2a so that the position of the discharge port 2c changes.

As shown in FIG. 1B, the electric motor 9 may be controlled by an ECU (electric control unit) 10. The ECU 10 may be supplied with an input signal or input signals, for example, a signal or signals from an internal air temperature sensor 11 for detecting the air temperature in a compartment, a signal or signals from an outside air temperature sensor 12 for detecting the air temperature outside the compartment, a signal or signals from a sunlight sensor 13 for detecting a sunlight amount, for example, the sunlight amount radiated on a rear seat, and/or a signal or signals from a temperature setting device 14 for setting the target temperature in the compartment by, for example, an occupant.

Based on the input signal or signals described above, the ECU 10 may calculate or otherwise determine a target blowout temperature (TAO). The ECU 10 may calculate or otherwise determine the target blowout temperature (TAO) in accordance, for example, with a computer program stored therein, for example, in a ROM (read-only memory) or the like.

A driven gear 2f, which may have an arc shape and may be engaged with the drive gear 2d, may be provided integrally with the scroll casing 2b on an outer wall of the scroll casing 2b. The driven gear 2f may be provided separately from the scroll casing 2b and fixed to the scroll casing 2b by using joining elements, for example, a screw or screws or by using a bonding element, such as an adhesive.

Figure 2:
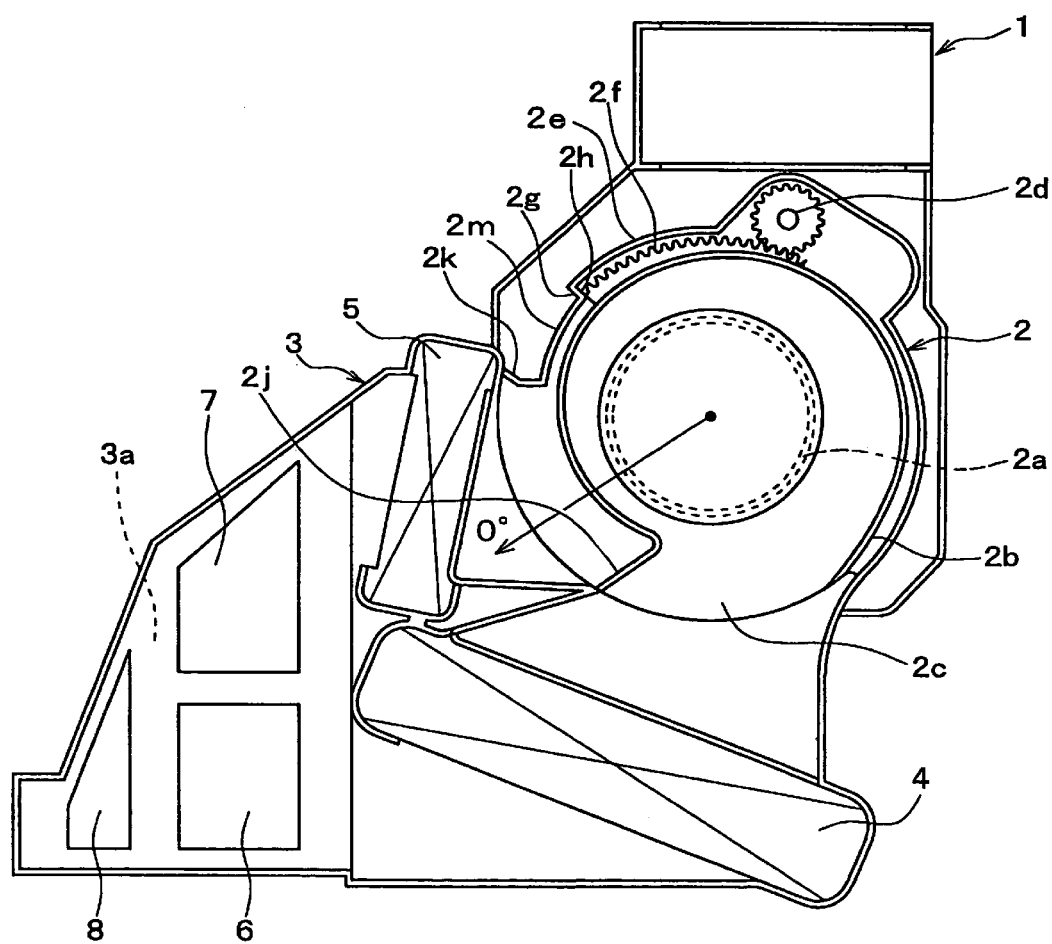
FIG. 2 illustrates an air conditioning unit in a maximum cooling mode according to an example embodiment of the present invention.

In an example embodiment, when the scroll casing 2b rotates counterclockwise to the position shown in FIG. 2, which may be considered a maximum cooling mode, an edge portion 2h of the driven gear 2f, acting as a first engaging portion, may abut a first step portion 2g of the fan casing 2e, also acting as a first engaging portion in a maximum cooling position and the ECU 10 may position the scroll casing 2b mechanically. Further, when the scroll casing 2b rotates clockwise to the position shown in FIG. 3, which may be considered a maximum heating mode, an edge portion 2j of the discharge port 2c, acting as a second engaging portion, may abut a second step portion 2k of the fan casing 2e, also acting as a second engaging portion in a maximum heating position and the ECU 10 may position the scroll casing 2b mechanically.

The fan casing 2e may have a bent portion 2m bent inward. The first step portion 2g and the second step portion 2k may be formed at both ends of the bent portion 2m.

An air conditioning case 3, which may be disposed on a downstream side of air flow, may accommodate an evaporator 4 and an heater 5, and may form one or more air passages or air paths, through which air discharged from the blower unit 2 passes. The air conditioning case 3 may be formed of resin, such as polypropylene.

The evaporator 4 which may act as a cooling heat exchanger for cooling air discharged into the compartment and the heater 5 which may act as a heating heat exchanger for heating air discharged into the compartment may be accommodated, on the air discharging side of the blower unit 2, in the air conditioning case 3. The evaporator 4 and the heater 5 may be arranged in parallel with each other with respect to a flow of air discharged from the blower unit 2, where parallel indicates that no air passes through the air path formed by the evaporator 4 and through the air path formed by the heater 5.

The evaporator 4 may be a low-pressure side heat exchanger of a vapor compression refrigeration cycle. The heater 5 may be a heating heat exchanger deriving heat from waste heat generated in a vehicle engine or the like. In an example embodiment, engine cooling water may be a heat source of the heater 5.

The evaporator 4 may be disposed below the heater 5 and substantially horizontally, so that air passes through the evaporator 4 downwardly. The evaporator 4 and the heater 5 may be arranged in a V-shape protruded toward the vehicle front in such a manner as to surround the blower unit 2.

The air conditioning case 3 may include air openings including a face air opening 6, a foot air opening 7 and/or a seat air conditioning opening 8 in the air downstream of the evaporator 4 and the heater 5.

The face air opening 6 may be connected to a face air duct (not shown). A face air outlet may be disposed at the end of the face air duct, and air generated by the blower unit 2 may be discharged from the face air outlet into the vehicle compartment. The face air duct may be embedded in a C pillar acting as a support at a rear window side and the face air outlet may be disposed on the vehicle ceiling above the rear seat.

The foot air opening 7 may be connected to a foot air duct (not shown). A foot air outlet, located at lower side of the rear seat of the vehicle, may be disposed at the end of the foot air duct and air generated by the blower unit 2 may be discharged from the foot air outlet into the vehicle compartment.

The seat air conditioning opening 8 may be connected to a seat air duct (not shown). A seat air outlet, located at the seatback, may be disposed at the end of the seat air duct and air generated by the blower unit 2 may be discharged from the seat air outlet into the vehicle compartment.

The air passed through the evaporator 4 and the air passed through the heater 5 may be mixed in an air mixing chamber 3a in the air conditioning case 3, at which the face air opening 6, the foot air opening 7, and the seat air conditioning opening 8 are disposed.

Air passing through the heater 5, when viewed from the evaporator 4 side, may be supplied to the compartment while bypassing the evaporator 4. An air passage having the heater 5 thus constituted, when viewed from the evaporator 4, may be a bypass passage of the air flowing into the compartment which bypasses the evaporator 4.

In a similar fashion, air passing through the evaporator 4, when viewed from the heater 5, may be supplied to the compartment while bypassing the heater 5. An air passage having the evaporator 4, therefore, when viewed from the heater 5, may constitute a bypass passage of the air flowing into the compartment which bypasses the heater 5.

Next, rotational control of the scroll casing 2b, in an example embodiment is explained.

The amount of rotational angle of the scroll casing 2b may be controlled according to the target blowout temperature TAO.

Figure 4:
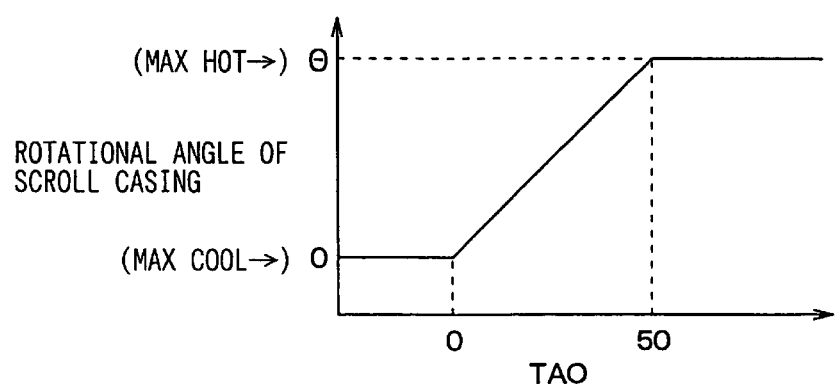
FIG. 4 illustrates the relation between the rotational angle of a scroll casing and a target blowout temperature TAO according to an example embodiment of the present invention.

For example, as shown in FIG. 4, the scroll casing 2b may be at position 0° in a maximum cooling mode, and may be at position Θ° in a maximum heating mode. The rotational angle of the scroll casing 2b may be increased (or decreased) in proportion to the increase (or decrease) in the target blowout temperature TAO.

The flow rates of air discharged from the blower unit 2 to the evaporator 4 and the heater 5 may be adjusted by changing the rotational angle of the scroll casing 2b.

For example, the discharge port 2c may be directed toward the evaporator 4, so that a flow rate of air supplied to the evaporator 4 is increased, while a flow rate of air supplied to the heater 5 is decreased.

By directing the discharge port 2c toward the heater 5, in contrast, the flow rate of the hot air may be increased, while the flow rate of the cool air may be decreased. As described, the ratio between the cool air flow rate and the hot air flow rate can be adjusted by rotating the scroll casing 2b.

Figure 3:
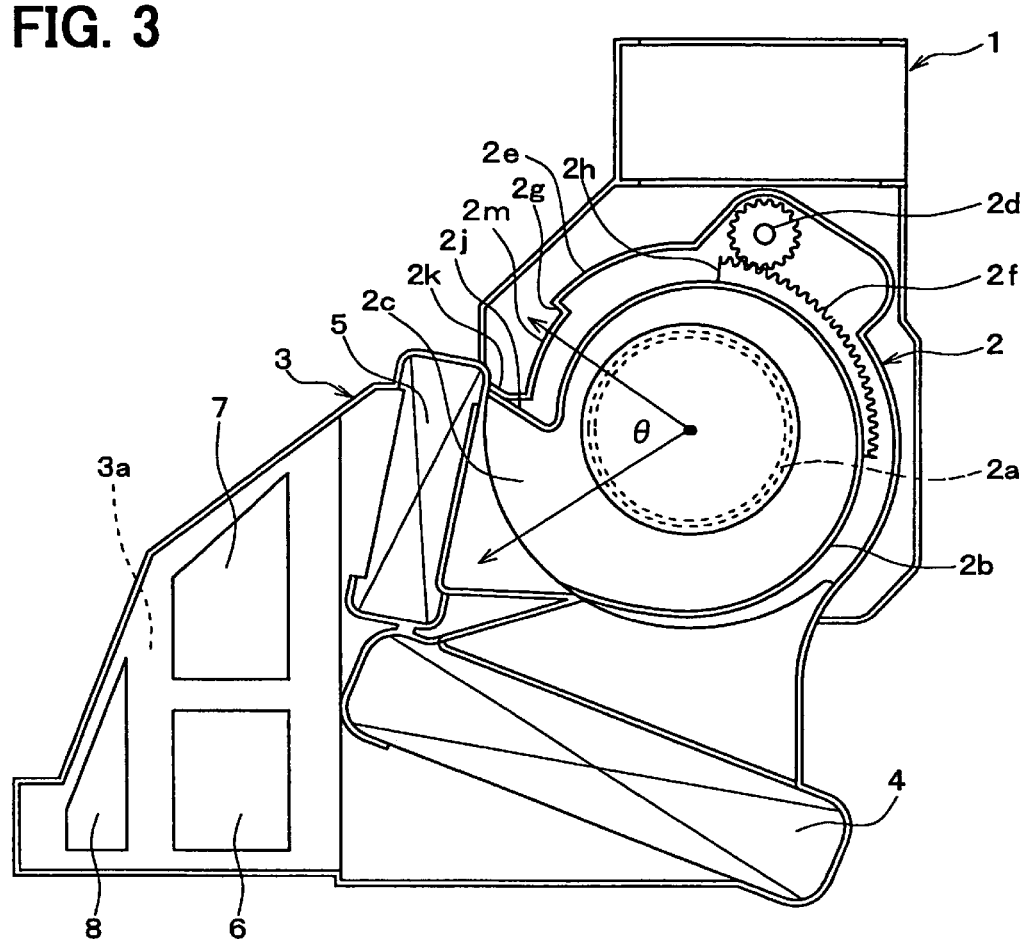
FIG. 3 illustrates an air conditioning unit in a maximum heating mode according to an example embodiment of the present invention.

That is, in a maximum cooling mode shown in FIG. 2, all the air discharged from the blower unit 2 may be supplied to the evaporator 4 thereby to set the cool air ratio to 100%, and in a maximum heating mode shown in FIG. 3, all the air discharged from the blower unit 2 may be supplied to the heater 5, thereby to set the hot air ratio to 100%.

Further, in an air-mixing mode, mixing the cool air and the hot air shown in FIG. 1A, the temperature of the air discharged into the compartment may be controlled by adjusting the ratio between the cool air flow rate and the hot air flow rate based on the target blowout temperature TAO.

As described above, in an example embodiment, the edge portion 2h of the movable driven gear 2f may abut the first step portion 2g of the immovable fan casing 2e and the ECU 10 may position the scroll casing 2b mechanically. Further, the edge portion 2j of the movable discharge port 2c may abut the second step portion 2k of the immovable fan casing 2e and the ECU 10 positions the scroll casing 2b mechanically.

After the ECU 10 positions the scroll casing 2b mechanically, the precision of the position of the scroll casing 2b and/or the precision of the temperature of air discharged into the compartment can be improved.

According to example embodiments, the temperature of air discharged into the compartment may be controlled by adjusting the ratio between the cool air flow rate and the hot air flow rate. According to example embodiments, the temperature of air discharged into the compartment may be controlled without an air-mixing door. According to example embodiments, the temperature of air discharged into the compartment may be controlled with a smaller (for example, smaller volume) air conditioning unit.

According to example embodiments, the evaporator 4 may be disposed below the heater 5 and/or substantially horizontally, so that condensed water generated in the evaporator 4 may be discharged out from the air conditioning case 3.

According to example embodiments, the evaporator 4 and the heater 5 may be arranged in a V-shape protruded toward the vehicle front to surround the blower unit 2. As a result, the volume of the air conditioning unit 1 may be reduced.

According to example embodiments, the evaporator 4 and the heater 5 may be disposed so as to not overlap with each other. However, as shown in FIG. 5, in other example embodiments, the evaporator 4 and the heater 5 may be disposed to overlap such that a part of the cool air passed through the evaporator 4 passes through the heater 5.

Figure 5:
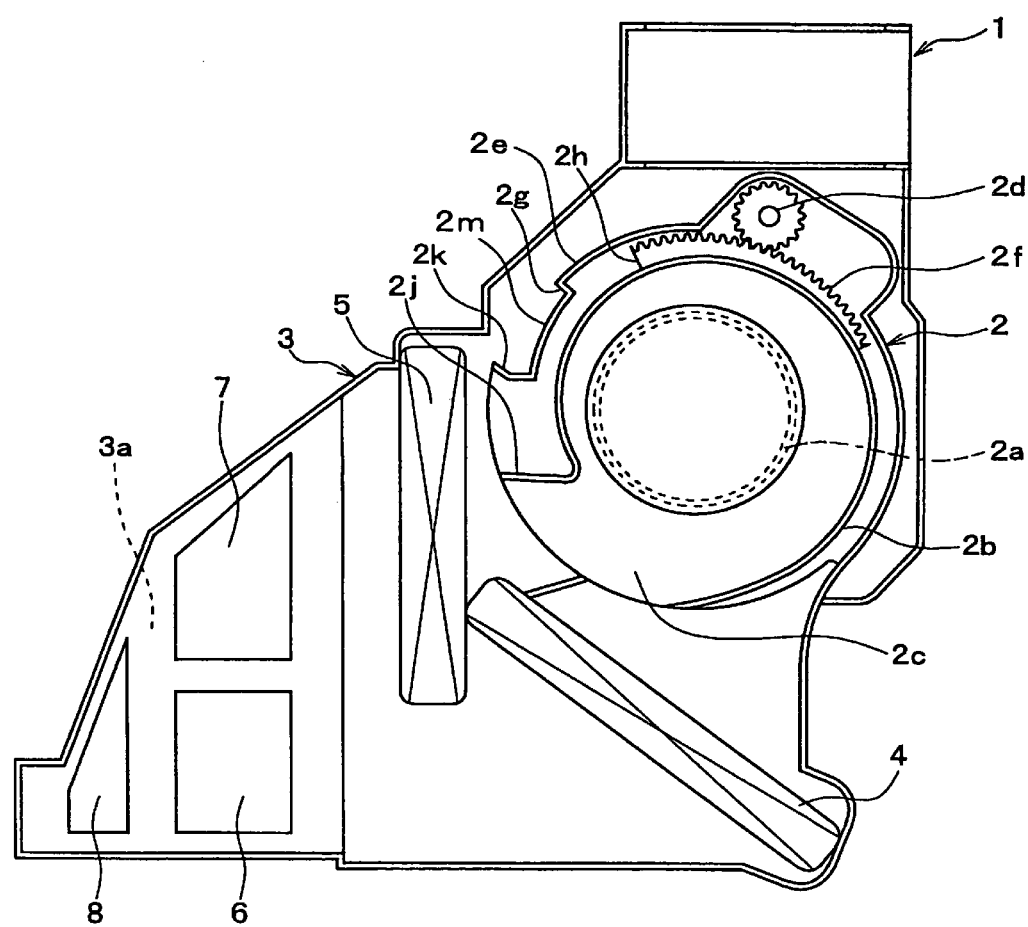
FIG. 5 illustrates an air conditioning unit according to another example embodiment of the present invention.

According to example embodiments, the evaporator 4 and the heater 5 may be arranged in a V-shape with either no overlap, as shown in FIGS. 1A, 2, and 3 or with partial overlap, as shown in FIG. 5.

Figure 6:
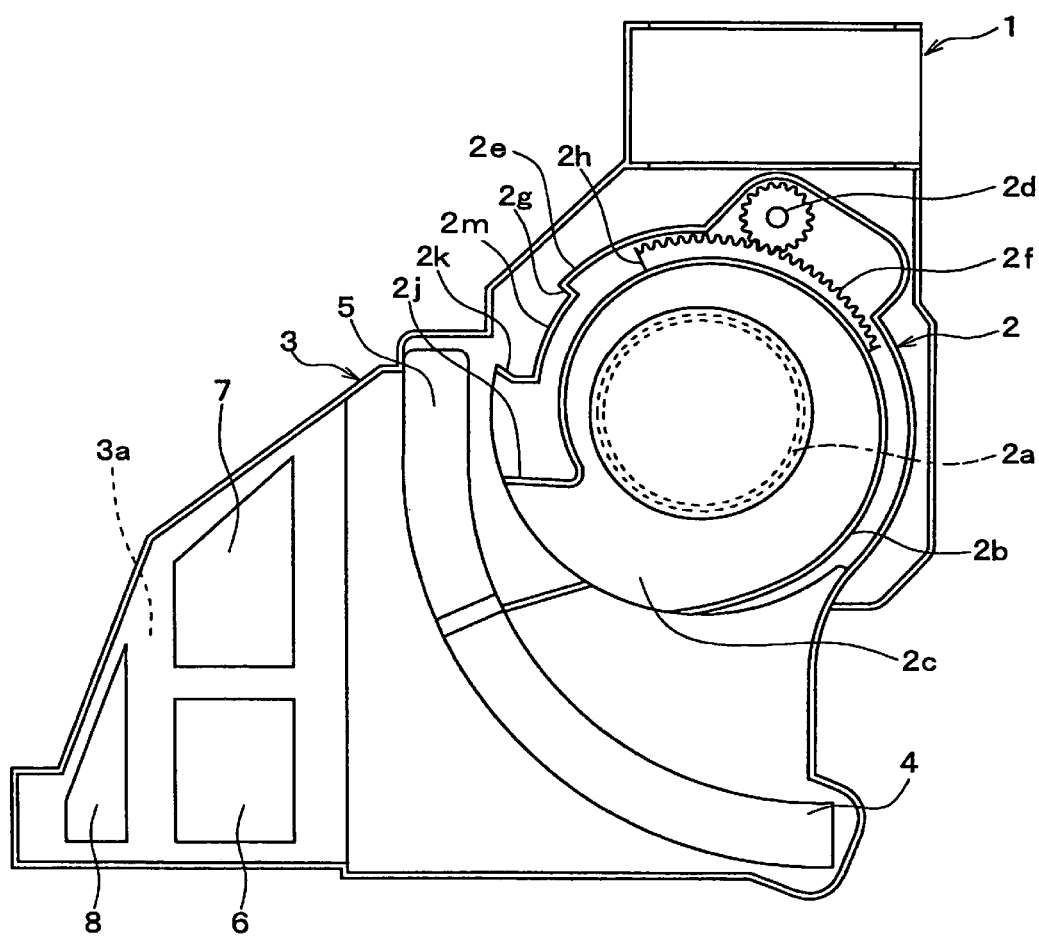
FIG. 6 illustrates an air conditioning unit according to another example embodiment of the present invention.

According to example embodiments, the evaporator 4 and the heater may be provided as independent parts. However, as shown in FIG. 6, in other example embodiments, the evaporator 4 and the heater 5 may be integrated with each other, for example, curved in a substantially arc shape.

Figure 7:
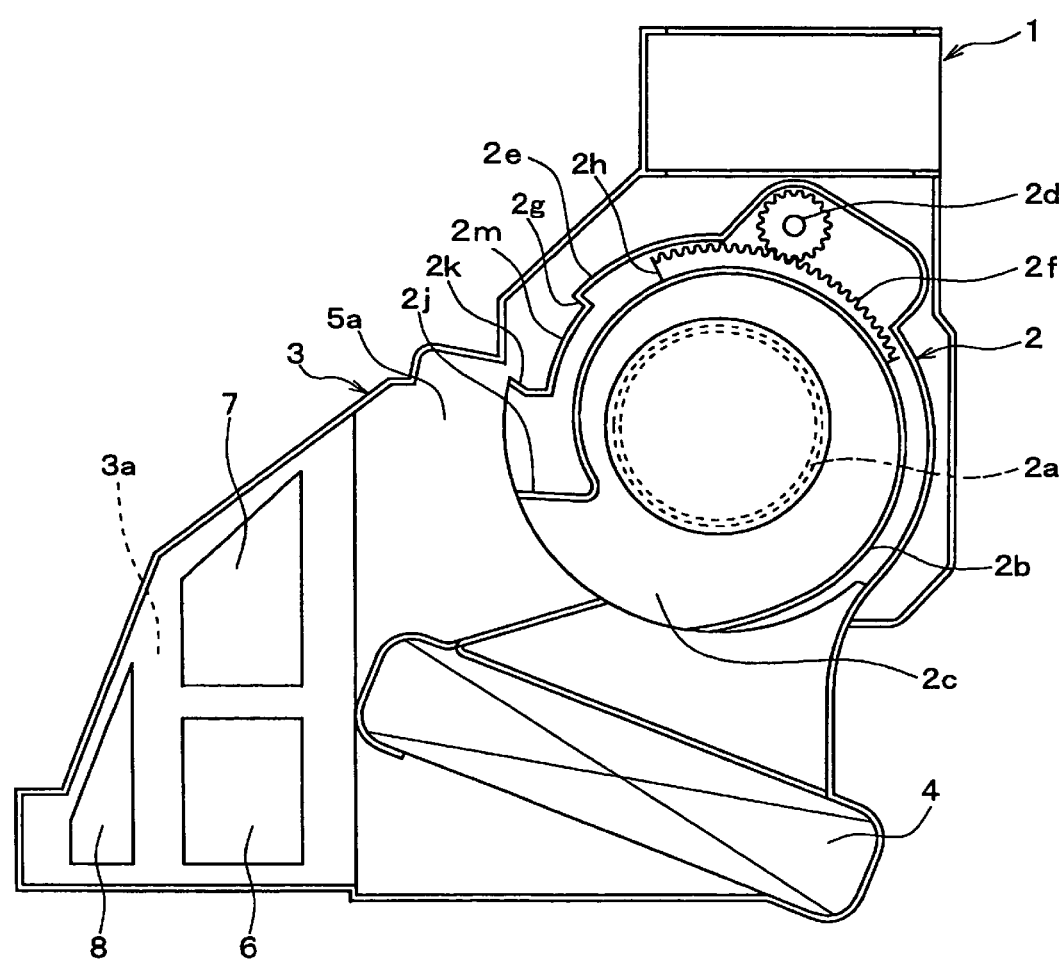
FIG. 7 illustrates an air conditioning unit according to another embodiment of the present invention.

Example embodiments are directed to an air conditioning unit including an evaporator 4 and a heater 5. However, as shown in FIG. 7, the heater 5 may be eliminated and be replaced by a bypass passage 5a for supplying air bypassing the evaporator 4.

In example embodiments, an air-mixing door may be eliminated and, therefore, the volume of the air conditioning unit 1 may be reduced.

In example embodiments, the temperature of the air supplied to the compartment may be adjusted by mixing the cool air cooled by the evaporator 4 and the air bypassed the evaporator 4 in the air mixing chamber 3a.

Figure 8:
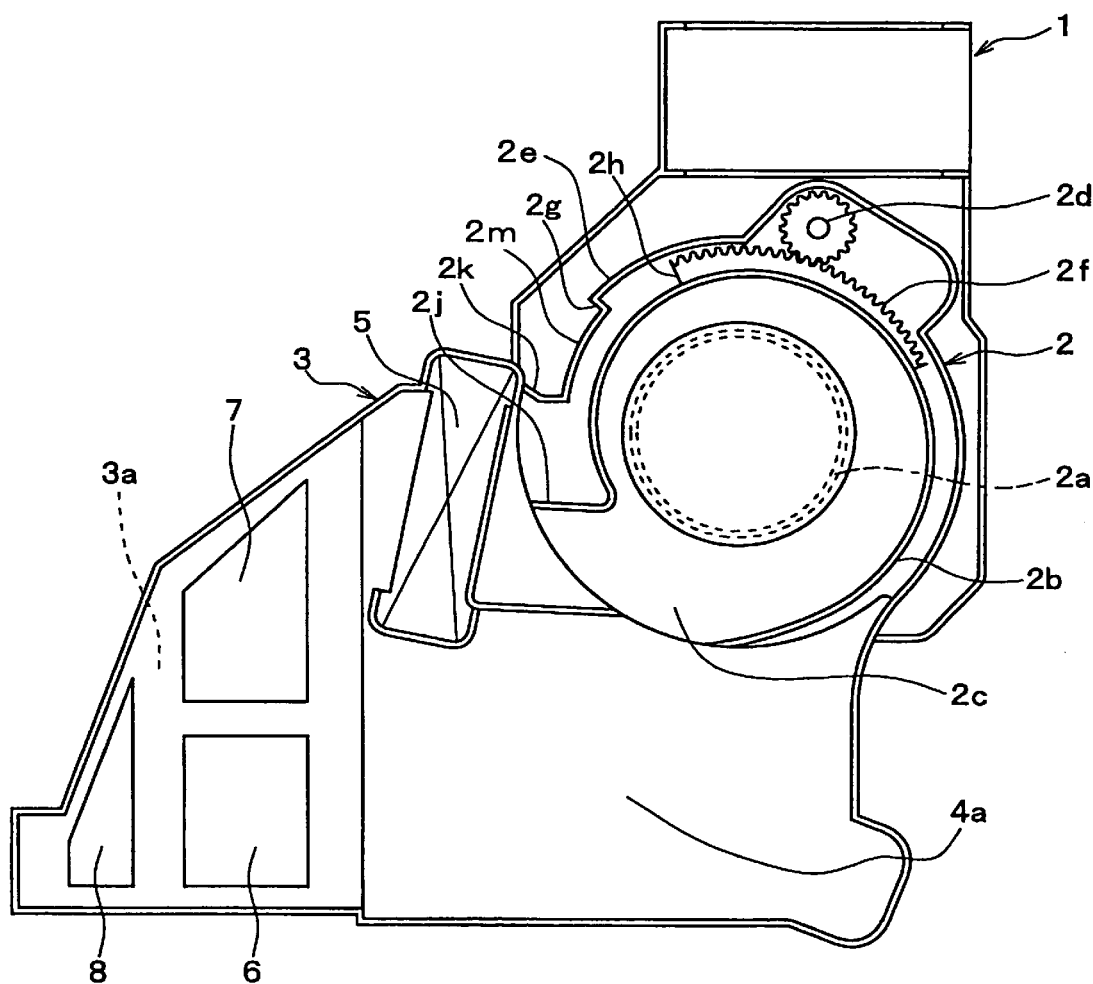
FIG. 8 illustrates an air conditioning unit according to another embodiment of the present invention.

Example embodiments are directed to an air conditioning unit including an evaporator 4 and a heater 5. However, as shown in FIG. 8, the evaporator 4 may be eliminated and replaced by a bypass passage 4a for supplying air bypassing the heater 5.

In example embodiments, the air-mixing door may be eliminated and, therefore, the volume of the air conditioning unit 1 may be reduced.

In example embodiments, the temperature of the air supplied to the compartment may be adjusted by mixing the hot air heated by the heater 5 with the air bypassing the heater 5 in the air mixing chamber 3a.

According to example embodiments, the ECU 10 may position the scroll casing 2b when the edge portion 2h abuts the first step portion 2g and when the edge portion 2j abuts the second step portion 2k. However, the ECU 10 may position the scroll casing 2b either when the edge portion 2h abuts the first step portion 2g or when the edge portion 2j abuts the second step portion 2k.

Although as described above, the scroll casing 2b includes first and second outward protruding portions and the fan casing 2e includes first and second inward protruding portions, any or all of these could be reversed as would be known to one of ordinary skill in the art.

Although as described above, the scroll casing 2b moves and the fan casing 2e remains stationary, this could also be reversed as would be known to one of ordinary skill in the art. Further, both the scroll casing 2b and the fan casing 2e could move, and example embodiments of the present invention could control the relative movement therebetween, as would be known to one of ordinary skill in the art.

According to example embodiments, the evaporator 4 may be disposed below the heater 5. However, as an alternative, the heater 5 may be disposed below the evaporator 4.

Also, according to example embodiments, the evaporator 4 and the heater 5 may be arranged in a V-shape, such that the evaporator 4 and the heater 5 do not overlap or partially overlap, protruding toward the vehicle front in such a manner as to surround the blower unit 2. However, the evaporator 4 and the heater 5 may be arranged in other configurations, for example, in parallel with each other (no overlap), as shown in FIG. 1A, 2, and 3, partly in parallel and partly in series (partial overlap), as shown in FIG. 5, or in series (complete overlap) with each other.

In example embodiments, the air conditioning unit according to the present invention may be used for air-conditioning a vehicle compartment, for example, a rear side of a vehicle compartment. In example embodiments, the air conditioning unit according to the present invention may be installed in a trunk behind a rear seat in such a manner that an inclined portion of the air conditioning unit shown in FIG. 1A is arranged substantially along a back of the rear seat. However, example embodiments of the present invention may also be used for air-conditioning a front side of a vehicle compartment and/or in a stationary compartment, for example, in a building.

Although the scroll casing 2b may be rotated by the drive gear 2d in the example embodiments described above, the present invention is not limited to this configuration.

In the example embodiments described above, the blower unit 2a may include a fan 2a, for example a centrifugal fan, for sucking air from an axial direction thereof and discharging the air toward a radial direction thereof. However, the blower unit 2 may include an axial-flow fan, for example, JIS B 0132, No. 1017 for allowing the air to pass through the cross section orthogonal to the rotating shaft, and a casing for accommodating the axial-flow fan to form an air passage.

Such variations are not to be regarded as departure from the spirit and scope of the example embodiments of the present invention, and all such modifications as would be obvious to one skilled in the art are intended to be included within the scope of the following claims.

What is claimed is:

1. A blower unit comprising:
a scroll casing accommodating a fan therein, the scroll casing including a first engaging portion;
a fan casing accommodating the scroll casing therein, the fan casing including a first engaging portion; and
a controller for controlling an electric motor to move at least one of the scroll casing and the fan casing such that the movement of at least one of the scroll casing and the fan casing stops when the first engaging portion of the scroll casing abuts the first engaging portion of the fan casing, wherein
the first engaging portion of the scroll casing is an outward protruding portion protruding radially outward away from the fan, and the first engaging portion of the fan casing is an inward protruding portion protruding radially inward toward the fan.

2. The blower unit according to claim 1, wherein the scroll casing further includes a second engaging portion and the fan casing further includes a second engaging portion such that the movement of the at least one of the scroll casing and the fan casing stops when the second engaging portion of the scroll casing abuts the second engaging portion of the fan casing.

3. The blower unit according to claim 2, wherein the second engaging portion of the scroll casing is an outward protruding portion and the second engaging portion of the fan casing is an inward protruding portion.

4. The blower unit according to claim 3, wherein the outward protruding portion is an edge portion of a discharge port of the scroll casing and the inward protruding portion of the fan casing is a second step portion.

5. The blower unit according to claim 4, wherein the movement of at least one of the scroll casing and the fan casing stops at a maximum heating position.

6. The blower unit according to claim 1, wherein the fan is a centrifugal fan sucking air from an axial direction thereof and discharging said air in a radial direction thereof.

7. The blower unit according to claim 1, wherein the fan is a axial-flow fan for allowing air to pass through a cross section orthogonal to a rotating shaft and a casing for accommodating the axial-flow fan to form an air passage.

8. The blower unit according to claim 1, further comprising a discharge port, the position of the discharge port changing when at least one of the scroll casing and the fan casing rotates around an axis thereof.

9. A blower unit comprising:
a scroll casing accommodating a fan therein, the scroll casing including a first engaging portion;
a fan casing accommodating the scroll casing therein, the fan casing including a first engaging portion; and
a controller for controlling an electric motor to move at least one of the scroll casing and the fan casing such that the movement of at least one of the scroll casing and the fan casing stops when the first engaging portion of the scroll casing abuts the first engaging portion of the fan casing, wherein
the first engaging portion of the scroll casing is an outward protruding portion and the first engaging portion of the fan casing is an inward protruding portion; and
the outward protruding portion is an edge portion of a drive gear attached to the scroll casing and the first protruding portion of the fan casing is a first step portion.

10. The blower unit according to claim 9, wherein the movement of at least one of the scroll casing and the fan casing stops at a maximum cooling position.

11. The blower unit according to claim 9, wherein the fan is a centrifugal fan sucking air from an axial direction thereof and discharging said air in a radial direction thereof.

12. The blower unit according to claim 9, wherein the fan is a axial-flow fan for allowing air to pass through a cross section orthogonal to a rotating shaft and a casing for accommodating the axial-flow fan to form an air passage.

13. The blower unit according to claim 9, further comprising a discharge port, the position of the discharge port changing when at least one of the scroll casing and the fan casing rotates around an axis thereof.

14. A blower unit comprising:
a scroll casing accommodating a fan therein, the scroll casing including a first engaging portion;
a fan casing accommodating the scroll casing therein, the fan casing including a first engaging portion; and
a controller for controlling an electric motor to move at least one of the scroll casing and the fan casing such that the movement of at least one of the scroll casing and the fan casing stops when the first engaging portion of the scroll casing abuts the first engaging portion of the fan casing, wherein
the first engaging portion of the scroll casing is an inward protruding portion protruding radially inward toward the fan and the first engaging portion of the fan casing is an outward protruding portion protruding radially outward away from the fan.

15. The blower unit according to claim 14, wherein the movement of at least one of the scroll casing and the fan casing stops at a maximum cooling position.

16. An air conditioning unit comprising:
a blower unit generating air flow;
an air conditioning case disposed on a downstream side of the air flow;

a first air path accommodated in said air conditioning case;

a second air path accommodated in said air conditioning case;

said air conditioning case including an air opening, through which air from said first air path and air from said second air path may pass therethrough;

said blower unit including:

a scroll casing accommodating a fan therein, the scroll casing including a first engaging portion;

a fan casing accommodating the scroll casing therein, the fan casing including a first engaging portion; and a controller for controlling an electric motor to move at least one of the scroll casing and the fan casing such that the movement of at least one of the scroll casing and the fan casing stops when the first engaging portion of the scroll casing abuts the first engaging portion of the fan casing.

17. The air conditioning unit according to claim 16, wherein said first air path includes a first heat exchanger.

18. The air conditioning unit according to claim 17, wherein the first heat exchanger is a cooling heat exchanger.

19. The air conditioning unit according to claim 17, wherein the first heat exchanger is a heating heat exchanger.

20. The air conditioning unit according to claim 18, wherein said second air path includes a second heat exchanger.

21. The air conditioning unit according to claim 20, wherein said second heat exchanger heat exchanger is a heating heat exchanger.

22. The air conditioning unit according to claim 21, wherein said first heat exchanger and said second heat exchanger are arranged in parallel.

23. The air conditioning unit according to claim 21, wherein said first heat exchanger and said second heat exchanger are arranged in series.

24. The air conditioning unit according to claim 21, wherein said first heat exchanger and said second heat exchanger partlaiiy overlap.

25. The air conditioning unit according to claim 21, wherein said first heat exchanger and said second heat exchanger do not overlap.

26. The air conditioning unit according to claim 21, wherein said first heat exchanger and said second heat exchanger are arranged in a V-shape.

27. The air conditioning unit according to claim 21, wherein said first heat exchanger and said second heat exchanger are integrated.

28. The air conditioning unit according to claim 16, wherein said first air path includes a bypass passage.

29. The air conditioning unit according to claim 19, wherein said second air path includes a bypass passage.

* * * * *